（12）United States Patent
Sutter et al.

(10) Patent No.: US 7,730,465 B2
(45) Date of Patent: Jun. 1, 2010

(54) MIXED TYPES

(75) Inventors: Herbert P Sutter, Bellevue, WA (US);
Jeffrey J Peil, Redmond, WA (US);
Brandon R Bray, Redmond, WA (US);
Mark L Hall, Redmond, WA (US);
Jonathan E Caves, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1088 days.

(21) Appl. No.: 10/972,161

(22) Filed: Oct. 22, 2004

(65) Prior Publication Data

US 2006/0101032 A1 May 11, 2006

(51) Int. Cl.
*G06F 9/45* (2006.01)
(52) U.S. Cl. .................. 717/141; 717/116; 717/140
(58) Field of Classification Search .................. 717/141
See application file for complete search history.

(56) References Cited

U.S. PATENT DOCUMENTS

| 5,371,891 | A  | * | 12/1994 | Gray et al. .................. 717/140 |
| 5,665,073 | A  | * | 9/1997  | Bulow et al. ................. 604/263 |
| 6,473,773 | B1 | * | 10/2002 | Cheng et al. ................. 707/200 |
| 6,505,344 | B1 | * | 1/2003  | Blais et al. .................. 717/151 |
| 6,598,141 | B1 | * | 7/2003  | Dussud et al. ............. 711/170 |
| 6,625,804 | B1 | * | 9/2003  | Ringseth et al. ............. 717/114 |
| 6,629,112 | B1 | * | 9/2003  | Shank et al. ................. 707/206 |
| 6,865,657 | B1 | * | 3/2005  | Traversat et al. ............. 711/170 |
| 6,925,638 | B1 | * | 8/2005  | Koved et al. ................. 717/155 |
| 7,076,773 | B2 | * | 7/2006  | Schmidt ..................... 717/148 |
| 7,165,239 | B2 | * | 1/2007  | Hejlsberg et al. ........... 717/114 |
| 7,346,897 | B2 | * | 3/2008  | Vargas ........................ 717/137 |
| 7,350,197 | B2 | * | 3/2008  | Savoy ........................ 717/137 |
| 2002/0104068 | A1 | * | 8/2002 | Barrett et al. ............... 717/104 |
| 2003/0154468 | A1 | * | 8/2003 | Gordon et al. .............. 717/143 |
| 2004/0230958 | A1 | * | 11/2004 | Alaluf ........................ 717/140 |
| 2004/0268328 | A1 | * | 12/2004 | Plesko et al. ................ 717/141 |

OTHER PUBLICATIONS

Chris Sells, "Visual Studio .NET: Managed Extensions Bring .NET CLR Support to C++", Jul. 2001, MSDN Magazine, pp. 1-12.*
"Ecma International Moves to Standardize C++ Binding for CLI", press release Oct. 6, 2003, pp. 1-3.*
"Integrating with COM Components", O'Reilly Media Inc., 2002-2003, pp. 1-31.*
"Borland Launches Enterprise C# Development Solution for Microsoft.NET Framework", Business wire, May 6, 2003, pp. 1-2.*
Nishant Sivakumar, "A first look at C++/CLI", retireved from "The code project", Apr. 27, 2004, pp. 1-5.*

(Continued)

*Primary Examiner*—Michael J Yigdall
*Assistant Examiner*—Marina Lee
(74) *Attorney, Agent, or Firm*—Workman Nydegger

(57) ABSTRACT

The present invention provides a system and/or method that facilitates programming within Common Language Runtime (CLR) for a C++ programmer by employing a mixed type. An inheritance component creates the mixed type from received code such that the mixed class type is allocated into memory into a pure native part and a pure managed part. Furthermore, construction, destruction and function calls for mixed types are provided facilitating programming within Common Language Runtime (CLR).

34 Claims, 11 Drawing Sheets

OTHER PUBLICATIONS

Jeffrey Richter, "Garbage Collection: Automatic Memory Management in the Microsoft .NET Framework", MDSN Magazine 2000, pp. 1-51.*

Kate Gregory, "Managed, Unmanaged, Native: What Kind of Code Is This?", retrieved from <www.developer.com/net/cplus/article.php/2197621>, Apr. 28, 2003, pp. 1-4.*

Herb Sutter, "Standard C++ Meets Managed C++", retrieved from C/C++ User Journal's C++.NET solution supplement, Sep. 2002, pp. 1-9.*

Nishant Sivakumar, "A first look at C++/CLI", retrieved from <http://www.codeproject.com/KB/mcpp/cppcliintro01.aspx>, Apr. 27, 2004, pp. 1-6.*

Herb Sutter, "A Design Rationale for C++/CLI", Feb. 24, 2006, retrieved from <http://www.gotw.ca/publications/C++CLIRationale.pdf>, pp. 1-54.*

C++/CLI, Language Specification, Working Draft 1.7, Sep. 2004, Publication Time: Jun. 8, 2004 10:16 PM, 200 pages.

* cited by examiner

| Source code:<br>Managed class X | Actual type:<br>Managed class X ($X_{mpart}$) | Actual type:<br>Native class X__n ($X_{npart}$) |
|---|---|---|
| [ref\|value] class X<br>, public N<br>, private N2<br>, public I<br>, public RN<br>{ | [ref\|value] class X {<br><br><br>: public I<br>, public RN($RN_{mpart}$)<br>{ | class X__n {<br>: public N<br>, private N2<br><br>, public RN__n<br>{ |
| R r;<br>V v;<br>S s;<br>N n;<br>RN rN;<br>NR nR; | R r;<br>V v;<br>S s;<br><br>RN rN__m($RN_{mpart}$)<br>$NR_{mpart}$ | <br><br><br>N n;<br>RN__n rN__n;<br>$NR_{npart}$ |
| R* rp;<br>V* vp;<br>S* sp;<br>N* np;<br>RN* rNp;<br>NR* nRp; | R*<br>V*<br>S*<br>N*<br>RN*<br>NR* | |
| R& rr;<br>V& vr;<br>S& sr;<br>N& nr;<br>RN& rNr;<br>NR& nRr; | R&<br>V&<br>S&<br>N&<br>RN&<br>NR& | |
| R^ rh;<br>V^ vh;<br>S^ sh;<br>N^ nh;<br>RN^ rNh;<br>NR^ nRh; | R^<br>V^<br>S^<br>N^<br>RN^<br>NR^ | |
| }; | X__n* __nimpl; → <br>}; | ← GCHandle __mimpl;<br>}; |

FIG. 3

| Source code:<br>Native class X | Actual type:<br>Managed class X<br>($X_{mpart}$) | Actual type:<br>Native class X__n ($X_{npart}$) |
|---|---|---|
| class X<br>, public N<br>, private N2<br>, public I<br>, public RN<br>{ | ref class X {<br><br><br>: public I<br>, public RN<br>($RN_{mpart}$)<br>{ | class X__n {<br>: public N<br>, private N2<br><br>, public RN__n<br><br>{ |
| R r;<br>V v;<br>S s;<br>N n;<br>RN rN;<br><br>NR nR; | R r;<br>V v;<br><br><br><br>RN rN__m;<br>($RN_{mpart}$)<br>$NR_{mpart}$ | <br><br>S s;<br>N n;<br>RN__n rN__n;<br><br>$NR_{npart}$ |
| R* rp;<br>V* vp;<br>S* sp;<br>N* np;<br>RN* rNp;<br>NR* nRp; | | R*<br>V*<br>S*<br>N*<br>RN*<br>NR* |
| R& rr;<br>V& vr;<br>S& sr;<br>N& nr;<br>RN& rNr;<br>NR& nRr; | | R&<br>V&<br>S&<br>N&<br>RN&<br>NR& |
| R^ rh;<br>V^ vh;<br>S^ sh;<br>N^ nh;<br>RN^ rNh;<br>NR^ nRh; | R^<br>V^<br>S^<br>N^<br>RN^<br>NR^ | |
| }; | X__n* __nimpl; → | ← GCHandle __mimpl;<br>}; |

FIG. 4

MIXED TYPES

TECHNICAL FIELD

The present invention generally relates to computer systems, and more particularly to a system and method to employ a mixed type that facilitates programming such that cross type inheritance (e.g., cross inheritance to create a mixed type) is facilitated.

BACKGROUND OF THE INVENTION

As computer science has evolved, object oriented programming has become one of many familiar models designers and programmers utilize to implement functionality within computer systems. The object model generally is defined by a class structure that includes class members providing both methods and associated data elements belonging to the class. The class members thus provide/define desired functionality within a computer program, wherein an object is declared as an instance of a particular class. As is commonplace, objects often must exchange data and/or invoke other objects operating on the same platform and/or communicate with objects belonging to remote platforms. In order to communicate between objects, interface systems and standards have been developed to define how objects may communicate and/or interact with one another.

A familiar system for communicating and interfacing between objects is known as the Component Object Model (COM), wherein another similar system is referred to as the Common Object Request Brokers Architecture (CORBA). Still yet other communication interfaces may be defined in languages such as JAVA within an operating framework of a Java Virtual Machine, for example. As these and other systems have been developed however, two common object architectures or models generally have emerged and may generally be defined in terms of managed and unmanaged object systems, for example.

Managed objects may be allocated from a heap within a managed software or execution environment and are generally not responsible for managing associated object lifetimes. Managed objects may be described in terms of a data type (e.g., metadata) and automatically collected (e.g., reclaimed) by a managed environment "garbage collector" that removes the object from memory when the object is no longer being accessed. In contrast, unmanaged objects may be allocated from a standard operating system heap, wherein the object itself is responsible for freeing memory it employs when references to the object no longer exist. This may be accomplished through well-known techniques such as reference counting, for example.

As described above, managed objects may be allocated from a managed heap and automatically garbage collected. In order to achieve this, references to managed objects are traced. In one example, reference counting can be used wherein a last reference to an object is removed, the garbage collector reclaims the memory occupied by the object mitigating the need to reference count managed objects. Yet in a Common Language Runtime (CLR), memory is not reclaimed until a garbage collector is run (e.g., which normally happens with a triggering of low resource conditions). Thus in general, a managed environment essentially handles garbage collection internally. Tracing is possible within managed code because the managed environment keeps track of outstanding references that exist on an object. As each new object reference is declared within managed code, the managed environment adds the reference to a list (e.g., building the list on the fly). At any given time, the managed environment, rather than the object itself, is thus aware of live references that exist on a given object. As references fall out of scope or change value, the list (built on the fly) is determined by knowing a combination of stack walking and how to inspect areas of memory owned by the garbage collector, and as long as a reference remains within managed code, the managed environment is able to trace it. Unfortunately, object references originating from unmanaged code present difficulties when interacting with a managed environment.

One difficulty associated with unmanaged references operating in a managed environment relates to that there is substantially no straightforward way for managed environments to trace references from unmanaged code to managed objects. Even if the managed environment were aware of these references, generally, no information is maintained indicating whether a reference is active or inactive. Thus, since unmanaged clients, for example, are written in unmanaged code, presently, there is not a process for tracing references that unmanaged objects may hold on managed objects executing within a managed environment. Similarly, originating calls from managed environments to unmanaged environments also presents problems relating to managing object lifetimes. For example, unmanaged objects expect to be reference counted, but in a managed environment reference counting is not required for managed objects. It would thus be very confusing if developers that design managed code had to handle references to managed and unmanaged objects differently.

Along with object lifetime management problems described above, managed and unmanaged object systems generally differ in many other significant ways. These differences may include how the object systems provide object interfaces within the respective object systems, how data is structured and/or defined, and how errors and exceptions are handled, for example. Due to these and other differences between managed and unmanaged object systems, it is presently difficult, time consuming, and expensive in terms of development costs to have objects from an unmanaged system interface and interact with objects from a managed system and visa versa. Moreover, it is generally difficult for managed objects designed according to one object system framework to communicate with objects from an architecturally different managed system framework. This also applies to unmanaged object communications between diverse unmanaged system frameworks.

A classic paradigm relating to managed and unmanaged systems originates from a programming standpoint. Each programming language provides certain characteristics wherein strengths and weaknesses are exposed by, for example, programmers, critics, hackers, and other program languages themselves. Therefore, a programmer must take good with bad when choosing to program for a managed system and/or unmanaged system. Common Language Runtime (CLR) and C++ Standard are examples of a managed and unmanaged systems respectively, wherein each system delivers tailored benefits and detriments to the individual programmer. Thus, programmers have diverged based upon programming preferences (e.g., type instantiation in memory areas, garbage collection, pointing and reference to types, . . . ) in relation to managed systems or unmanaged systems.

In particular, an unmanaged system allows a programmer to have freedoms not available in a managed system such as freedom with user defined types being instantiated anywhere (e.g., heap or stack), yet does not provide garbage collection. For example, a standard C++ program provides a class template in which "policy" controls where an instance of a type is instantiated—yet the definition of the type itself does not control this instantiation. Thus, a C++ environment provided users with certain idioms controlling where or where not a type is instantiated.

On the other hand, various compilers and other tools expose a managed system's functionality that enable designers to write code that benefits from a managed execution environment. Thus, code that is developed with a language compiler that targets a managed system such as, for example, a Common Language Runtime (CLR) is referred to as managed code. This type environment employs features such as, for example, garbage collection based on type, reflection, and handles to reference whole objects.

Managed and unmanaged systems have developed a divergence in programming preference based upon the individual strengths and weakness of managed and unmanaged systems such as, for example, C++ and Common Language Runtime (CLR). In view of the above, there is a need to integrate C++ and Common Language Runtime (CLR) such that strengths are provided wherein weaknesses are concurrently complimented.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that facilitate programming utilizing a mixed type wherein the mixed type allows consistent treatment of managed types and native types in a plurality of contexts. In particular, benefits within C++ are incorporated into a Common Language Runtime (CLR), and the benefits of a Common Language Runtime (CLR) are incorporated into C++. Mixed types allow C++ features for managed types such as auto storage duration and/or deterministic finalization for reference and value types. Additionally, the Common Language Runtime's (CLR's) features such as garbage collection and finalization for native types are available utilizing the mixed type.

In accordance with one aspect of the subject invention, a system is provided that creates a mixed type utilizing an inheritance component to facilitate programming. The inheritance component receives code, wherein the code is distinguished as pure native, pure managed, and mixed native/managed. The pure native classes are allocated by a compiler such that no members are added or changed. The pure managed classes are allocated by a runtime such that no members are added or changed. Inheritance component creates a mixed type wherein the mixed native/managed portions are allocated in two parts of memory, a pure native part (e.g., npart) and a pure managed part (e.g., mpart). More particularly, a system in accordance with the invention includes a component that receives code to be utilized by a compiler, the code having: pure native portion(s), pure managed portion(s) and mixed native/managed portion(s). An inheritance component designates respective sections of the mixed native/managed portion(s) as pure native parts (npart) and/or pure managed parts (mpart) to facilitate compiling of the code.

In accordance with another aspect of the subject invention, a system is provided that restricts a compiler in order to create the mixed type. The inheritance component does not require the compiler to add an additional Normal GCHandle to a gcnew'd mixed object as an internal object model implementation detail beyond the user-defined members of the class. Moreover, the inheritance component does not require the compiler to implement a ^ as a Normal GCHandle or otherwise physically placing the implementation of a handle (^) such that the garbage collection cannot be done.

In yet another aspect in accordance with the subject invention, the inheritance component interacts with a construction component and a compiler in order to construct a mixed type. The construction component facilitates utilizing the mixed type for a user such that construction of virtual bases, native bases, and managed bases is regulated. Moreover, the inheritance component interacts with a destruction component, wherein destruction of virtual bases, native bases, and managed bases is regulated. Furthermore, the destruction of a mixed type is provided such that the native and managed part are destroyed in accordance with the subject invention.

In another aspect in accordance with the subject invention, the inheritance component further utilizes a function component wherein function calls for mixed types are employed. The function component facilitates calling functions for a mixed class type such that name lookup occurs as if the class where not split into two parts (e.g., an npart and an mpart).

The following description and the annexed drawings set forth in detail certain illustrative aspects of the invention. These aspects are indicative, however, of but a few of the various ways in which the principles of the invention may be employed and the present invention is intended to include all such aspects and their equivalents. Other. advantages and novel features of the invention will become apparent from the following detailed description of the invention when considered in conjunction with the drawings.

BRIEF DESCRIPTION OF THE DRAWINGS

FIG. 3 illustrates a layout for a managed class X with native members for possible types of members.

FIG. 4 illustrates a layout for a native class X with managed members for possible types of members.

DESCRIPTION OF THE INVENTION

Figure 1:
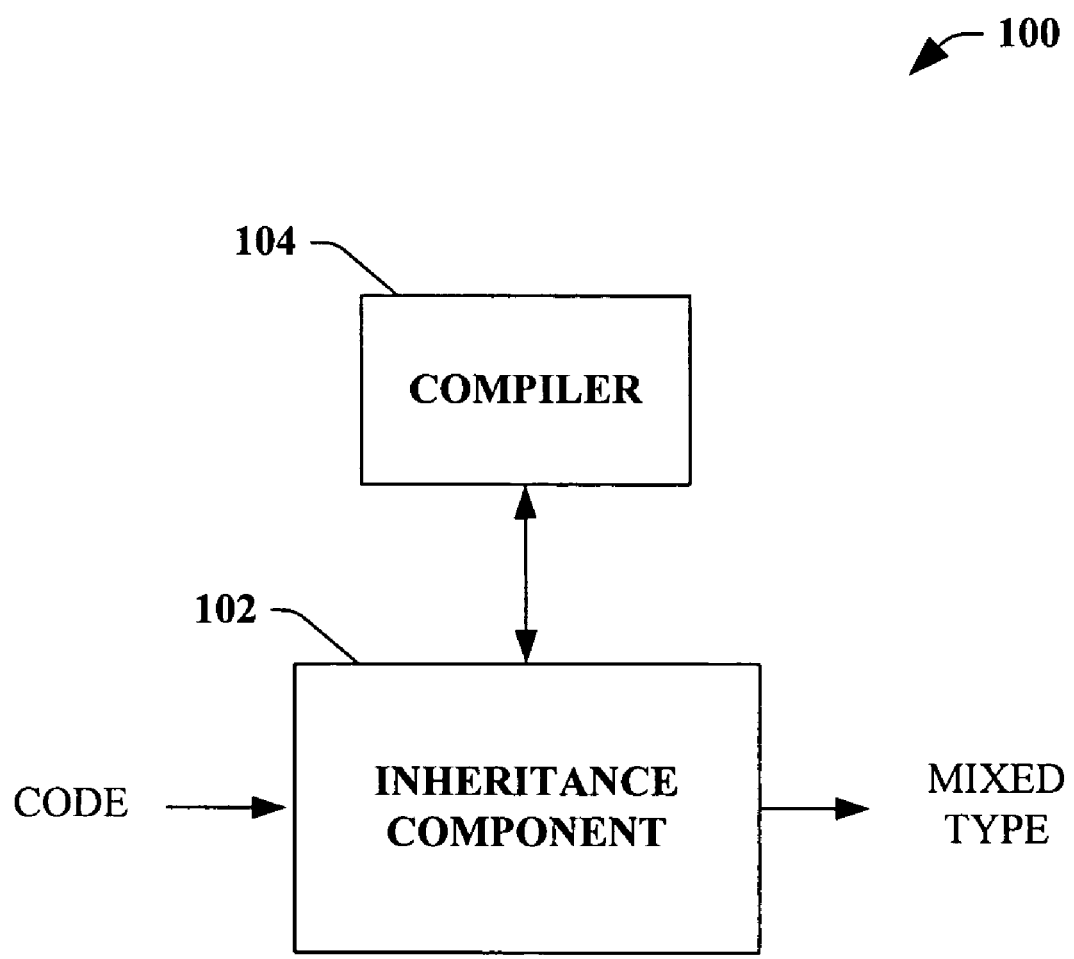
FIG. 1 illustrates a block diagram of an exemplary system that facilitates programming by employing a mixed type that allows managed types and native types to be treated consistently in a plurality of contexts.

The present invention relates to systems and methods that facilitate dynamic programming language execution in a managed code environment. A runtime code generator is provided within the framework of a managed object environment. The code generator includes a class allocator that reserves one or more method slots for a dynamic method call. A dynamic method builder then employs the method slots to generate an intermediate language stream that forms a method description. The method description is then fed to a Just-In-Time (JIT) compiler that returns at least one dynamically generated pointer to facilitate execution of the dynamic method call at runtime. A set of application programming interfaces (APIs) are provided to give users a managed "hook" or entry point into the compiler and associated managed execution environment, wherein various other applications for dynamically generated pointers are also supported. By using runtime-code generation, dynamic calls can be compiled at runtime, and if so desired in combination with memorization, the cost of dynamic code can be brought down close to that of ordinary method calls.

As used in this application, the terms "component," "class," "allocator," "system," "builder," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The present invention is described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a system 100 that facilitates enabling cross type inheritance (e.g., cross inheritance to create a mixed type) allowing C++ classes to mix-in managed interfaces and bases and reference classes within Common Language Runtime (CLR) to mix-in native base classes interacting with a compiler 104. A code is received by an inheritance component 102, wherein mixed types are created providing a computer programmer with benefits of C++ and Common Language Runtime (CLR). The inheritance component 102 analyzes the code and distinguishes a pure native type (e.g., a native class type having no user defined members or base classes of managed type or A type), a pure managed type (e.g., a managed class type having no user-defined members or base classes of native type, *, or &), and a mixed native and managed type (e.g., a managed or native class type that is not a pure managed class or a pure native class). Employing a mixed type (e.g., mixed native and managed type) allows the system 100 to incorporate benefits of C++ to the Common Language Runtime (CLR) and the benefits of Common Language Runtime (CLR) to C++. Utilizing mixed types, the system 100 provides the programmer with the appearance of complete inheritance between a managed heap and a native heap. However, the inheritance component 102 provides underlying code implementations giving programmers the feel of cross inheritance between types and interfaces.

The inheritance component 102 facilitates programming, for example, within a .NET platform wherein the programmer is a C++ developer. By combining C++ qualities to .NET and the Common Language Infrastructure, a powerful programming model exists with multiple benefits. One benefit is that all types in a code can be conceptually instantiated in all memory areas (e.g., managed heap, native heap, and/or stack). The definition of a type no longer affects where that type can be allocated. Additionally, all types can be garbage collected whether or not the type is allocated on the managed heap. Garbage collection is per-object, providing garbage collection on some but not objects of a given type. Another benefit is the inheritance component 102 allows *, &, and ^ to refer to all types. Additionally, * has consistent meaning regardless on the type it points.

Furthermore, the system 100 provides any native or managed (e.g., reference or value) class can have at least one of the following: a destructor and/or finalizer; inheritance from multiple virtual or nonvirtual base classes and implement multiple interfaces; instances placed on the stack, static storage, raw storage, native heap, and/or managed heap; and pointer or reference type that points to any type and behaves similarly regardless of the where the location is pointed.

The pure native type distinguished by the inheritance component 102 is laid out in memory on the native heap. The inheritance component 102 allows objects to be allocated on the native heap by the command "new." Furthermore, objects on the native heap are referred to by utilizing native pointers (*). For example, the code as follows allocates a native object on the native heap:

```
N* n1 = new N;    // allocate a native object on the native heap
N* n2 = n1;       // n1 and n2 point to the same object
```

The native heap provides certain advantages such as class hierarchy. For example, common multiple inheritance is lost when utilizing ref class within Common Language Runtime (CLR). However, when programming in native code, such as C++, memory allocation and location are consistent. For example, a C++ code as follows creates x and y:

```
class C {
    int x;
    double y;
}
```

The programmer knows int x is going to be allocated first, then padding and then double y. The layout of classes within C++ are consistent and the same. However, when utilizing a ref class within Common Language Runtime (CLR), the Common Language Runtime (CLR) takes over and location of x and y are unknown to the programmer. In other words, memory allocation within a managed system (e.g., Common Language Runtime (CLR)) can change.

Furthermore, the pure managed type distinguished by the inheritance component 102 is laid out in memory on the managed heap (e.g., garbage collection heap). Objects can be allocated on the managed heap by the command "gcnew." Moreover, objects can be referred to utilizing handles (^). For example:

```
R^ r1 = gcnew R;    // allocate a managed object on the managed heap
R^ r2 = r1;         // r1 and r2 point to the same object
```

The managed heap provides garbage collection that reclaims memory for the program whether or not the delete command is used. The managed heap provides advantages such as, reflection, security, and as stated supra, garbage collection. It is to be appreciated compacting garbage collection is provided within the managed heap. For example, runtimes are garbage collected because object allocation changes, thus mitigating memory leaks. Compacting garbage collection makes memory more efficient by utilizing locality of reference (e.g., keeping allocated frequently used items together) and locality of time (e.g., referencing the same items).

The inheritance component 102 employs a mixed type by laying out a pure native part (e.g., npart) and a pure managed part (e.g., mpart) in memory. Utilizing a mixed type allows C++ programmers to treat managed types and native types consistently in all contexts. The inheritance component 102 requires the compiler 104 to insert underlying code such that the two families of types appear to be unified to a C++ user. Thus, the C++ user is free to use the types as necessary independent of how the type is defined. Furthermore, the inheritance component 102 provides pointer operators to C++ such as, a ^ "handle" and a % "tracking reference." The "handle" is a whole object pointer to a managed object. The "tracking reference" is a reference to any object or subobject.

In order to treat managed types and native types consistently in all contexts, the inheritance component 102 does not require the compiler 104 to add an additional "Normal GCHandle" to a mixed object that has been created utilizing "gcnew" as an internal object model implementation detail beyond the user-defined members of the class. For example, a design can require the compiler 104 to physically split an object's layout across noncontiguous pieces of memory. Extra pointer information is required in at least one of the pieces to enable internal navigation to another piece(s). Additionally, the compiler 104 must add that additional internal navigation information using only native pointers or non-Normal GCHandles if the object is allocated via gcnew.

Moreover, the inheritance component does not require the compiler 104 to implement a ^ as a Normal GCHandle or otherwise enable physically placing the implementation of a handle (^) in a place that a garbage collector cannot locate. It is to be appreciated that ^ must always be implemented as a normal ISO CLI object reference, and if a ^ appears as a member of a class type, the object layout ensures ^ member is physically placed on the managed heap or stack.

By restricting the compiler 104, the inheritance component 102 provides a user the appearance of unified types within C++ and Common Language Infrastructure (CLI). The inheritance component 102 utilizes the requirements above in order to prevent the garbage collector to collect free cycles of ^'S including a Normal GCHandle. Thus, using a GCHandle in the implementation of the object layout model or in the implementation of the ^ handle is anathema.

For example, a pure reference class is as follows:

```
ref struct R {
    R^ next;
};
void NoLeak( ) {
    R^ r = gcnew R;
    r->next = r;
}
```

The function NoLeak allocates an R instance on a managed heap, points it to itself, and releases the handler r. R instance is a trivial cycle of ^'s, and the garbage collector is designed to collect this cycle. In other words, the cycle is not leaked.

In another example, a native class is as follows:

```
struct N {
    N^ next;
};
void NoLeak( ) {
    N^ n = gcnew N;
    n->next = n;
}
```

The function NoLeak behaves in a similar fashion such that the cycle of ^'s is not leaked. In other words NoLeak allocates an N instance on the managed heap, points it to itself, and releases the handle n. The N instance on the managed heap is a cycle of ^'s, and the garbage collector can collect this cycle as other cycle of ^'s. Consider the following where the restraints are not enforced by the inheritance component 102. Without such constraints, the compiler 104 would implement N^ in terms of a Normal GCHandle embedded inside the native object. Yet, the garbage collector cannot collect a cycle of ^'s containing such an object of type N as if the N^ member is physically an ISO CLI object reference.

Figure 2:
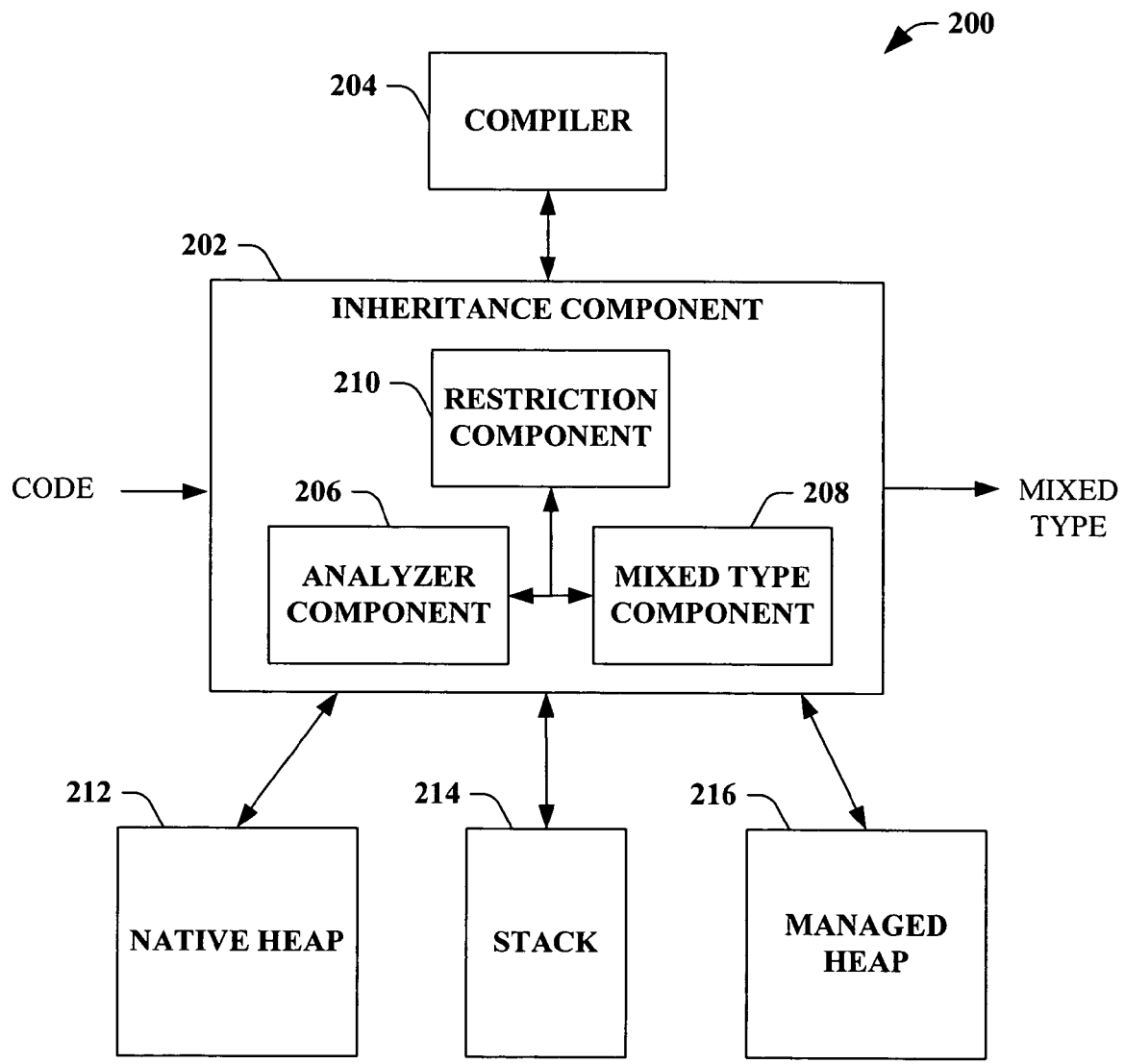
FIG. 2 illustrates a block diagram of an exemplary system that facilitates programming by employing a mixed type that allows managed types and native types to be treated consistently in a plurality of contexts.

Now turning to FIG. 2, a system 200 is illustrated that facilitates utilizing a mixed type, which allows C++ programmers to treat managed types and native types consistently in a plurality of contexts. An inheritance component 202 receives a code in which a separation of pure native, pure managed and mixed native and managed types occurs. A pure native class is a native class type having no user defined members or base classes of managed type or ^ type. A pure managed class is a managed class type having no user-defined members or base classes of native type, *, or &. A mixed type is a managed or native class type that is not a pure managed class or a pure native class. The inheritance component 202 requires a compiler 204 to implement underlying actions in order to give the appearance of types to be unified with the interaction between memory such as, but not limited to, a native heap 212, a stack 214, and a managed heap 216. The allocation of objects between the native heap 212, the stack 214, and the managed heap 216 are distinguished based upon code semantics. For example, an object programmed in a native code is allocated on the native heap and an object programmed in managed code is allocated on the managed heap (e.g., garbage collection heap).

An analyzer component 206 analyzes code such that a pure native type, a pure managed type and a mixed native and managed type are determined. Once determined, the inheritance component 202 lays out pure native classes by the compiler 204 on the native heap. In addition, the inheritance component 202 lays out pure managed classes on the managed heap. However, a mixed native and managed type determined utilizes underlying code in order to provide a programmer to treat types consistently in all contexts.

A restriction component 210 incorporates restrictions on the compiler 204 to facilitate creating a mixed type within the system 200. The restriction component 210 does not require the compiler 204 to add an additional Normal GCHandle to a gcnew'd mixed object as an internal object model implementation detail beyond the user-defined members of the class. Additionally, the restriction component 210 does not require the compiler 204 to implement a ˆ as a Normal GCHandle or otherwise physically placing the implementation of a handle (ˆ) in a place that the garbage collector cannot collect.

The system 200 further includes a mixed type component 208 that creates the mixed type in order to facilitate incorporating C++ programming into Common Language Runtime (CLR). A mixed type component 208 lays out the mixed native and managed type in memory as a pure native part (e.g., npart) and a pure managed part (e.g., mpart). By employing a mixed type, the inheritance component 202 facilitates coding that relates to garbage collection and type instantiation. For reference class types and native class types, the inheritance component 202 lays out the mpart such that it physically exists on the managed heap. Moreover, the inheritance component 102 allocates the mpart for value types such that it physically exists on the managed heap or the stack.

The mixed type component 208 creates the mpart such that mpart is a pure managed class obeying ISO CLI rules. The mpart inherits from any base class of managed type or from the mpart of any base class of mixed type, and inherits from (e.g., implements) any interface base classes. The mpart contains all members of managed and ˆ type. It is to be appreciated the mpart can contain members of simple value type if this is a managed class type. Moreover, mpart contains a native pointer named, for example, _nimpl to its corresponding npart. The _nimpl member is added at the end of the introducing base class (e.g., the class that first introduces the mpart such as the first managed or mixed class) subobject. The mpart also includes full metadata. It is to be appreciated layout of mpart is done by the runtime. Furthermore, the name of the mpart's type is the same as the fully decorated name of the class.

Furthermore, the mixed type component 208 creates the npart as a pure native class obeying the ISO C++ rules governing native classes. The npart can inherit from base classes of native type, and from the npart of any base class of a mixed type. The npart contains members of native type and a GCHandle (e.g., Normal or WeakTrackResurrection) named, for example, _mimpl to the corresponding mpart. It is to be appreciated the npart can additionally contain members of simple value type if this is a native class type. The mixed typed component 208 adds the _mimpl member at the end of an 'introducing base' class (e.g., the one that first introduces the mpart such as, the first managed or mixed class) subobject. It is to be appreciated the programmer can utilize a pointer to any pure native base subobject and pass as an argument to a function in an existing dynamic linked library (DLL) without disruption to the system 200. Mixed type component 208 creates the npart such that npart includes full program database (PDB) information. Moreover, mixed type component 208 allows npart to be laid out by compiler 204 similar to a pure native class type containing the members. Additionally, the name of the npart's type is X_n wherein X is the decorated name of the class. The npart is allocated into memory with the command new. It is to be appreciated that static members of the npart are unique in each application domain (e.g., appdomain).

Furthermore, the mixed type component 208 can receive code containing simple value types that are mixed native and managed. A simple value type is a value class type having no members of type Tˆ for any T and no members of type R (or any pointer or reference type referring to R) for any reference class type R. It is to be appreciated built-in types wherein native type and the corresponding unboxed ISO CLI value type are the same type (e.g., int and int32) are simple value types. The mixed type component 208 provides members of simple value type to appear in the mpart when it is a managed class type. Additionally, the mixed type component 208 provides members of simple value type to appear in the npart if this is a native class type.

Within the mixed type component 208, the class being defined within the received code can be a managed class. If the class being defined is a managed class, the mixed type component provides managed functions for all declared functions, including overrides. It is to be appreciated that if the function is virtual, the declared functions are in the in the mpart's vtable. Yet, if the class is a native class within the received code, the declared functions are native functions. When the functions within the native class are virtual, the declared functions are in the npart's vtable.

The mixed type component 208 creates the mixed class type such that inheritance is simplified. For example, if a managed type inherits from a native type then in the implementation the native part inherits from that type. In other words, the programmer need not program additional or special code based upon the inheritance component 202 creating the mixed types and associated compiler requirements.

The mixed class type created implements the appropriate N_interface interface. The native part of a mixed type utilizes traditional inheritance to inherit from any and all native bases. Moreover, the npart holds an _mimpl GCHandle to the mpart within the mixed type. The GCHandle can be, for example, Normal or WeakTrackResurrection, based at least upon the allocation technique utilized. GCHandles can be Normal, Weak, WeakTrackResurrection, or pinned. For example, if an instance is allocated with new, the GCHandle is Normal; if an instance is allocated with gcnew or with stack-based semantics, the GCHandle will be WeakTrackResurrection. Furthermore, the mpart within a mixed type holds an _nimpl pointer to the native part. A most-base mixed type owns the GCHandle and the pointer based at least in part upon the native and managed parts that are controlled. Thus, no further pointers or GCHandles are necessary since the mpart derives from the base mpart and the npart is the primary base of the npart.

It is also to be appreciated that additional base interfaces can be added regardless of derivation distance from a mixed type. Yet, additional base interfaces cannot be added with new managed or mixed base classes. Therefore, the mixed type component 208 selects a base managed type other than Object to define most-base mixed type.

Referring to FIG. 3, a layout for a managed class X with native members for possible types of members is illustrated. It is to be appreciated members that are of mixed type (e.g., RN or NR, where RN is a mixed reference type declared as ref class RN having members or base classes of native * or & type; and NR is a mixed native type declared as class NR having members or base classes of managed type or ˆ type) exists in two parts (e.g., the mpart and the npart). The mpart contributes the enclosing class's mpart and the npart contributes to the enclosing class's npart. As seen in FIG. 3, the mixed type is created such that a pure managed class $X_{mpart}$ relates to the managed code. Similarly, the mixed type created contains a native class $X_{npart}$.

Turning to FIG. 4, a layout for a native class X with managed members for possible types of members is illustrated. The layout differs from the managed class X in that simple value type appears in the npart rather than the mpart. The mixed type is received from the code and the mixed type is created into a pure managed class and a pure native class. The pure managed class X has an $X_{mpart}$ and the pure native class X_n has a $X_{npart}$.

Figure 5:
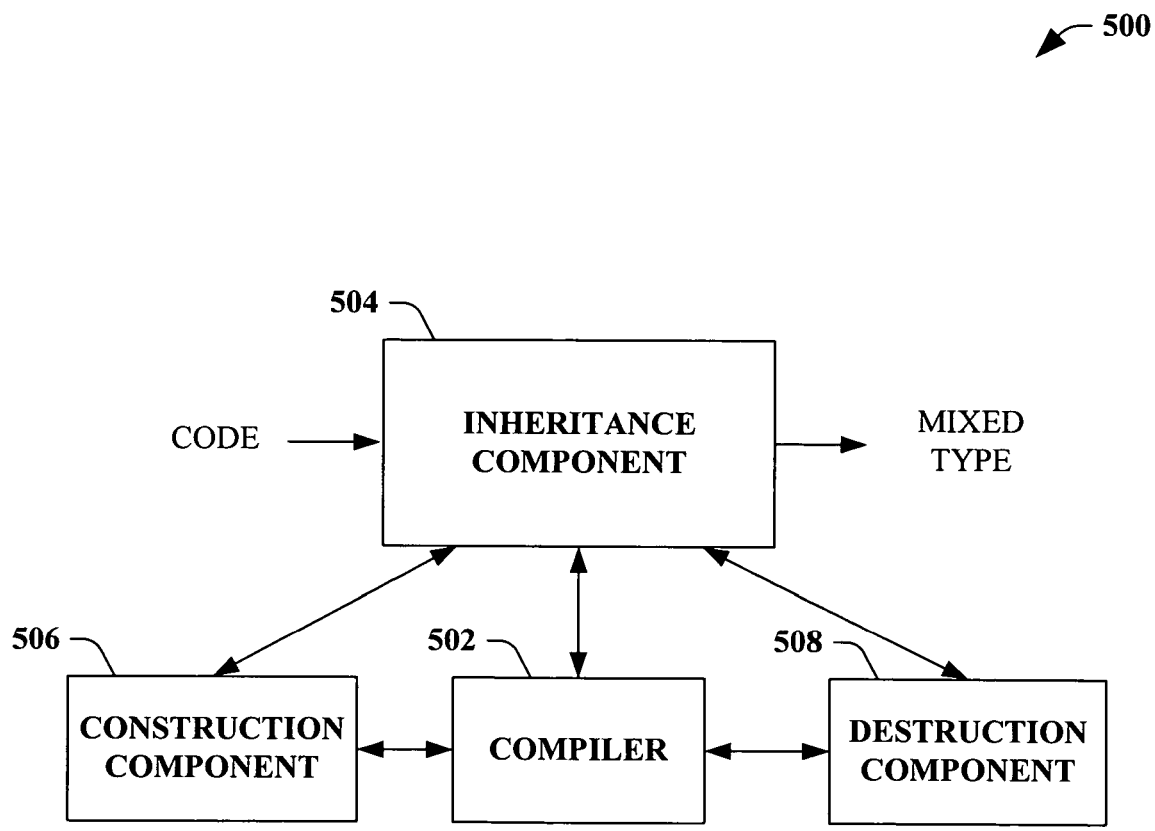
FIG. 5 illustrates a block diagram of an exemplary system that facilitates programming by employing a mixed type that allows managed types and native types to be treated consistently in a plurality of contexts.

FIG. 5 illustrates a system 500 that facilitates employing a mixed type, wherein the mixed type mitigates complications involving cross type inheritance within C++ and Common Language Runtime (CLR). A code is received in which an inheritance component 504 distinguishes a pure native type, a pure managed type, and a mixed type (e.g., mixed native and managed type). The pure native types are laid out by a compiler 502 within memory. In other words, no members are added or changed. Similarly, pure managed types are laid out by a runtime (e.g., no members are added or changed).

When the inheritance component 504 determines the received code that contains a mixed type, the mixed type is broken into two parts—a pure native part (e.g., npart) and a pure managed part (e.g., mpart). The mpart is a pure managed class obeying ISO CLI rules governing managed classes. Moreover, the mpart inherits from bases class of managed type or from the mpart of any base class of mixed type and inherits from interface base classes. It is to be appreciated the mpart contains all members of managed and ^ type and a native pointer to a corresponding npart. For example, the pointer can be named _nimpl wherein it is added to the end of the introduced base class subobject.

Additionally, the npart is a pure native class that obeys ISO C++ rules governing native classes. The npart inherits from base classes of native type, and from the npart of any base class of mixed type. It is to be appreciated the npart contains all members of native type and a GCHandle to a corresponding mpart. For example, the GCHandle can be specified as _mimpl wherein it is added at the end of the introducing base class subobject.

Furthermore, the inheritance component 504 implements restrictions upon the compiler 502 such as, for example, not requiring the compiler 502 to add an additional Normal GCHandle to a gcnew'd mixed object as an internal object model implementation detail beyond the user-defined members of the class and not requiring the compiler 502 to implement a ^ as a Normal GCHandle or otherwise physically placing the implementation of a handle (^) in a place that the garbage collector cannot collect.

It is to be appreciated the inheritance component 504 creates mixed types such that advantages of C++ are incorporated into a NET environment and the advantages of .NET are incorporated into C++. For example, the system 500 provides any native or managed (e.g., reference or value) class can have at least one of the following: a destructor and/or finalizer; inheritance from multiple virtual or nonvirtual base classes and implement multiple interfaces; instances placed on the stack, static storage, raw storage, native heap, and/or managed heap; and pointer or reference type that points to any type and behaves similarly regardless of the where the location is pointed.

The system 500 further includes a construction component 506 wherein construction of any class type T is ensured. For example, any class type T has user-declared constructors, T::T( ). It is to be appreciated in a mixed type created by the inheritance component 504 that there are two different virtual dispatch mechanisms (e.g., the native vtable and the managed class' virtuals). The construction component 506 initializes native bases before managed bases. Additionally, the virtual behavior inside the native bases remains unchanged by the construction component 506 since native vtables are utilized. The virtual behavior inside the managed base also remains unchanged since it used the managed virtual mechanism.

As stated supra, the inheritance component 504 creates the mixed type containing an npart and mpart, wherein the npart of the mixed type has a GCHanIdle _mimpl set based upon allocation. If the allocation utilized is new, then GCHandle is Normal GCHandle. If the allocation with gcnew, the GCHandle is a WeakTrackResurrection GCHandle. Internally, the _mimpl GCHandle held by the npart is allocated prior to executing the managed base's constructor. Furthermore, the _nimpl npart pointer in the managed part is set prior to calling the native constructors. Construction component 506 determines whether a Normal or WeakTrackResurrection GCHandle is necessary based at least upon a hidden parameter indicating whether native new was used or not. The construction component 506 creates the constructor for each external accessible constructor provided and an additional constructor without the additional hidden parameter that forwards to the constructor with the added parameter. It is to be appreciated the mixed class's constructors (e.g., created by the construction component 506) that take the additional parameter have restrictive accessibility of their declared accessibility or internal (e.g., the forwarding constructors have accessibility originally specified).

Once the constructor component 506 provides the native base classes and managed base classes to be initialized, the initializers of all members are executed in order of specified by members in class definition. For example, the following code has constructor call ordering:

```
ref class R2 : NBase1, RBase1 {
    //...
};
ref class R3 : R2, NBase2, virtual NBase3 {
    NMember1;
    MMember1;
    NMember2;
    R3( ) : R2( ), NBase2( ), NBase3( ), NMember1( ), NMember2( ), MMember( ) { }
};
R3 r3;
```

The construction order utilized by the construction component 506 begins with the construction of the bases of R3 (e.g., virtual bases are first, then native bases in the ISO C++ order, then any managed based class). For example, NBase3 (virtual base class first), then NBase2 (native bases come before managed bases), then R2 with the suborder NBase1, RBase1, R2 members, and finally R2's constructor body. Next, the constructor component constructs R3's members (e.g., in ISO C++ order, such as the order appearing in class definition whether managed or unmanaged type). Thus, NMember1, MMember1, then NMember2 are constructed. Lastly, the construction component 506 executes R3's constructor body.

The system 500 further includes a destruction component 508 that ensures destruction for any class type T with a user-declared destructor such as T::~T( ). For example, the following code is user-declared destructors:

```
class N {           ref class R {        value class V {
public:             public:              public:
    ~N( );              ~R( );              ~V( );
};                  };                   };
```

The destruction component 508 implicitly declares and defines an inline public destructor if a class type T has no user-declared destructor. The destructor created by the destruction component 508 behaves semantically similar for any T. In particular, the destructor is invoked for an object when, for example, the object has automatic storage duration and is out of scope; the object has static storage duration and reaches the end of lifetime during program termination; the object is a member of an enclosing object that is destroyed; the object is dynamically allocated and a delete command is performed on a handle or a native pointer referring to the object; or when the object's destructor is invoked explicitly.

The destruction component 508 destroys members and base subobjects of a class in the inverse order of construction by the construction component 506. Otherwise, it is to be appreciated ISO C++ destructor rules are utilized by the destruction component 508, which includes reference types. With a native class, if a destructor is not defined, the destruction component 508 implicitly defines one within the compiler 502. This implicitly defined destructor calls destructors on embedded members of the class. Furthermore, the destruction of a mixed type is provided such that the native and managed part are destroyed in accordance with the subject invention.

In one example, a transitive closure of the generated destructor can end up not destructing members; in that case, an optimizer removes the call to the destructor. It is to be appreciated that reference and value classes have compiler 502 supplied destructors. Absence of a destructor in the type is interpreted as a destructor where transitive closure does not destruct members. The destructor component 508 interprets this as the types in the base class library contain only trivial destructors. When dealing with non-trivial destructors, compiler 502 emits a method definition for the destructor. Furthermore, the class implements the IDisposable interface defined as follows:

```
interface class IDisposable {
    void Dispose( );
};
```

Here, the non-trivial destructor method within the class explicitly implements the Destroy method from the interface created above. Thus, any managed type is determined if a non-trivial destructor is utilized at runtime. Additionally, destructors on managed types are implicitly virtual. It is to be appreciated the user need not explicitly implement IDisosable in code because that command is utilized only where destruction component 508 and compiler 502 determine there is a non-trivial destructor.

In another aspect in accordance with the present invention, the compiler 502 and destruction component 508 can statically determine a type that implements a destructor. Once determined, the compiler 502 calls the destructor directly. Yet, if no determination is made whether a dynamic type implements a destructor statically, code is injected at runtime based upon the compiler 502 and destruction component 508 such that the object is deleted.

Figure 6:
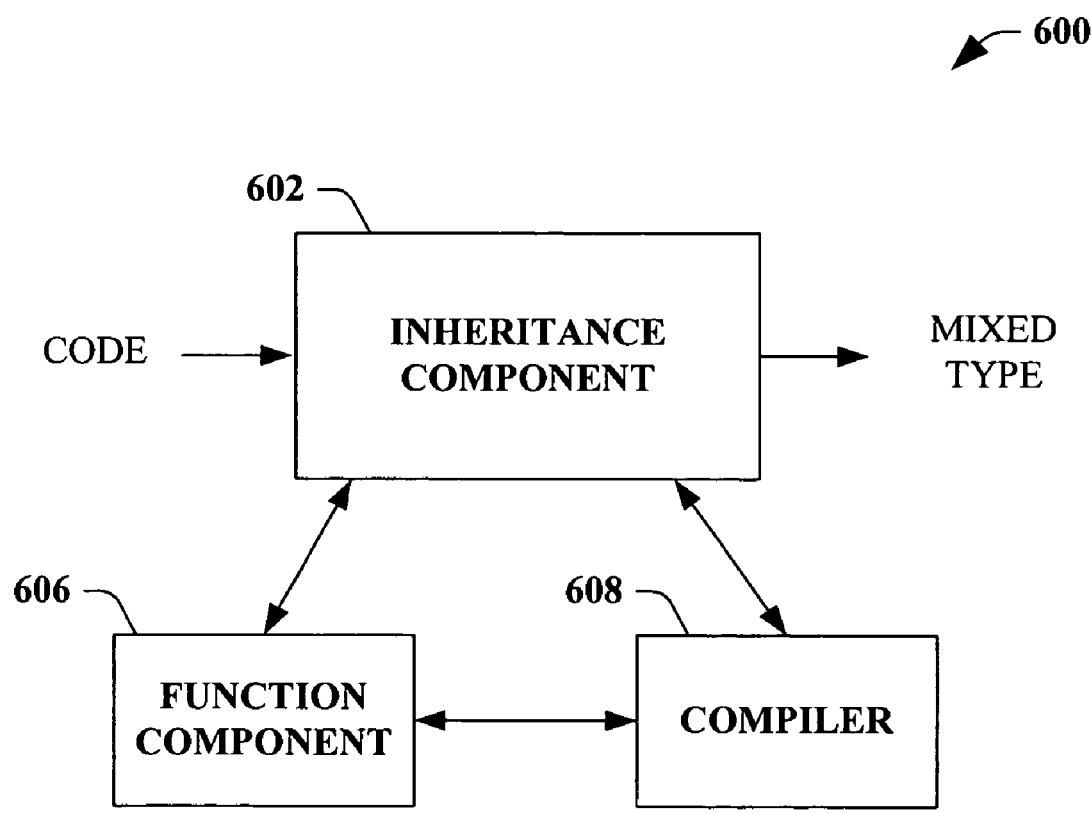
FIG. 6 illustrates a block diagram of an exemplary system that facilitates programming by employing a mixed type that allows managed types and native types to be treated consistently in a plurality of contexts.

FIG. 6 illustrates a system 600 that facilitates employing a mixed type, wherein the mixed type mitigates complications involving cross type inheritance within C++ and Common Language Runtime (CLR). A code is received by an inheritance component 602 from which a pure native, a pure managed, and a mixed native and manage are determined. The pure native is laid out by a compiler 604 such that no members are added or changed. Similarly, the pure managed is laid out by the runtime such that no members are added or changed. The inheritance component 602 determines a mixed native and managed as one that is not a pure managed class or a pure native class. The mixed native and managed is laid into memory into two parts, a pure native part (npart) and a pure managed part (mpart). The mpart is created by the inheritance component 602 such that the mpart is a pure managed class obeying ISO CLI rules governing managed classes. Moreover, the mpart inherits from bases class of managed type or from the mpart of any base class of mixed type and inherits from interface base classes. Furthermore, the npart is created by the inheritance component 602 such that the npart is a pure native class that obeys ISO C++ rules governing native classes. The npart inherits from base classes of native type, and from the npart of any base class of mixed type.

In one aspect in accordance with the subject invention, the inheritance component 602 restricts the compiler 604 in order to create the mixed types (e.g., mixed native and managed type). For example, the inheritance component 602 does not require the compiler 604 to add an additional Normal GCHandle to a gcnew'd mixed object as an internal object model implementation detail beyond the user-defined members of the class and does not require the compiler 604 to implement a ^ as a Normal GCHandle or otherwise physically placing the implementation of a handle (^) in a place that the garbage collector cannot collect. Utilizing the restrictions on the compiler 604 further facilitate creating mixed types for a C++ programmer within a NET environment.

The system 600 further includes a function component 606 interacting with the compiler 604 that facilitates calling functions for mixed types. The function component 606 and compiler 604 look up member names for a mixed type as if not split into two parts (e.g., npart and mpart). For example, an object m of mixed class type Mixed, two code contexts call a member function Mixed::f, one from an mpart context and another from an npart context. With mpart context, the call is made form a managed member function of Mixed (or one of Mixed's base classes), which exists in m's mpart, or from outside code that accesses the m object as a Mixed (e.g., m→f( )) or via one of Mixed's managed or mixed base classes. For example, ManagedOrMixedBase^ b=m; b→f( );), which means the access is done via m's mpart. When dealing with the npart context, the call is made from a native member function of Mixed (or of one of Mixed's base classes), which exists in m's npart, or from outside code that is accessing the m object via one of Mixed's native base classes. For example, NativeBase^ b=m; b→f( );), which means the access is done via m's npart.

In order to call the member function f, the compiler 604 and function component 606 utilize the name f in the symbol tables of both X (e.g., the mpart) and X_n (e.g., the npart). If no f is found, the program is ill-formed. Yet, if one or more viable functions f is found, and overload resolution and access checking both succeed identifying an unambiguous and accessible matching function f, the compiler 604 then generates the code to call f utilizing the function component 606.

In one aspect in accordance with the subject invention, a this-tracking-pointer conversion is required. For example, if the calling context is an mpart context and function f is found in the symbol table for X_n (npart) the compiler 604 needs to adjust the this-tracking-pointer such that the this-tracking-pointer is converted to a this-pointer, wherein the this-pointer is the address that is stored in _nimpl.

In yet another aspect in accordance with the subject invention, the calling context is an npart context such that the this-pointer is adjusted by the lookup component 606. For example, the function is found in the symbol table for X (mpart) the compiler 604 needs to adjust the this-pointer such that the this-pointer is converted to a this-tracking-pointer wherein the this-tracking-pointer is what is stored in _mimpl.

Once the appropriate conversions and adjustments are made by the compiler 604 utilizing the function component 606, the compiler 604 can generate the call to member function f on the appropriate object (e.g., X or X_n). Inside the member function f, the this-pointer is a pointer to the correct native or managed type in relation to the programmer and compiler 604. Thus, no special or additional code is necessary since the compiler 604 deals with a regular native or managed object.

For example, the following code can be written:

```
class B {
public:
    void f( ) { i__ += 1; }
private:
    int i__;
};
ref class D : public B {
};
int main( ) {
    D^ d = new D;
    d->f( );
}
```

The compiler 604 can encounter the expression d→f( ), wherein the function component 606 is utilized to look up the name f in the symbol tables of both D (the mpart) and D_n (the npart). Finding f in the latter, the compiler 604 generates code to call f. Following the example, the compiler 604 adjusts the code utilizing the function component 606 such that the this-tracking-pointer is converted to a this-pointer, wherein the this-pointer is the address stored in _nimpl. The conversion is based at least in part upon f is found in D_n's symbol table. It is to be appreciated inside the member function f, the appearance is given to the programmer and the compiler 604 that the this-pointer is a pointer to a B, and the lookup of the i_ member of B does not involve any special or additional code. In other words, the compiler 604 is dealing with a regular native object.

Figure 7:
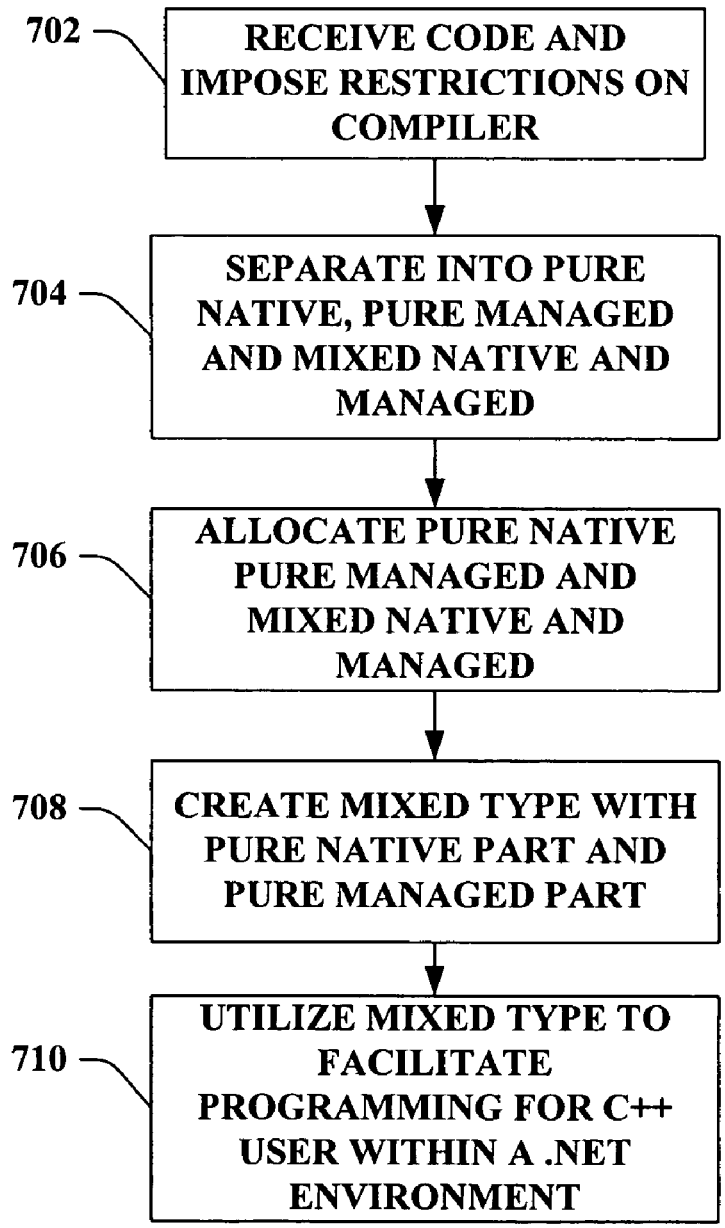
FIG. 7 illustrates a flow chart of an exemplary methodology that facilitates programming by employing a mixed type that allows managed types and native types to be treated consistently in a plurality of contexts.
Figure 8:
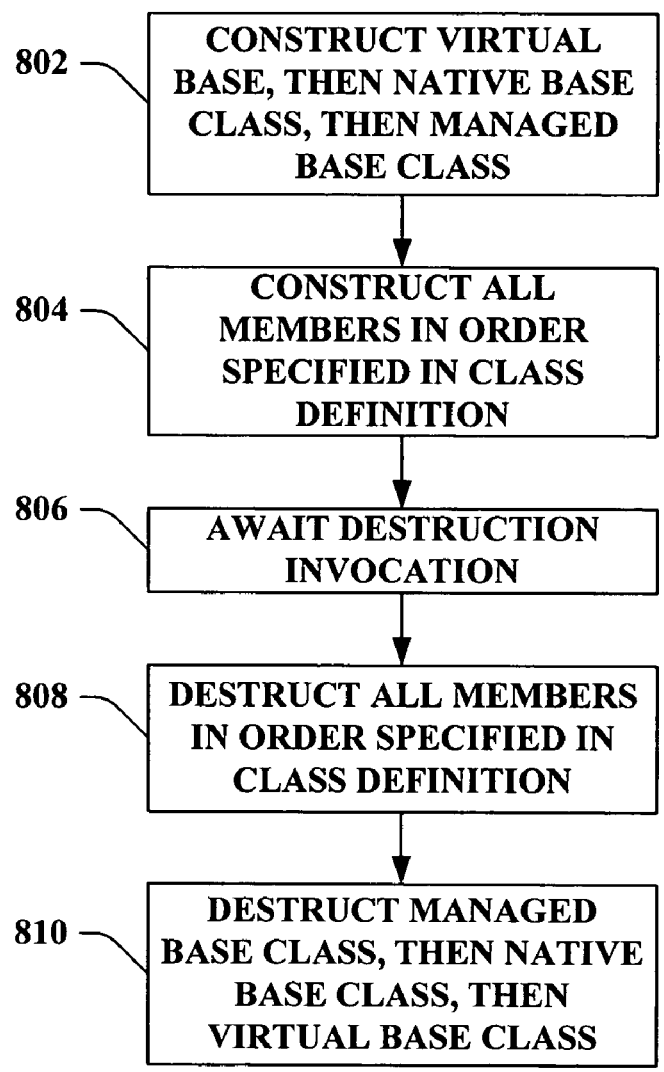
FIG. 8 illustrates a flow chart of an exemplary methodology that facilitates programming by employing a mixed type that allows managed types and native types to be treated consistently in a plurality of contexts.
Figure 9:
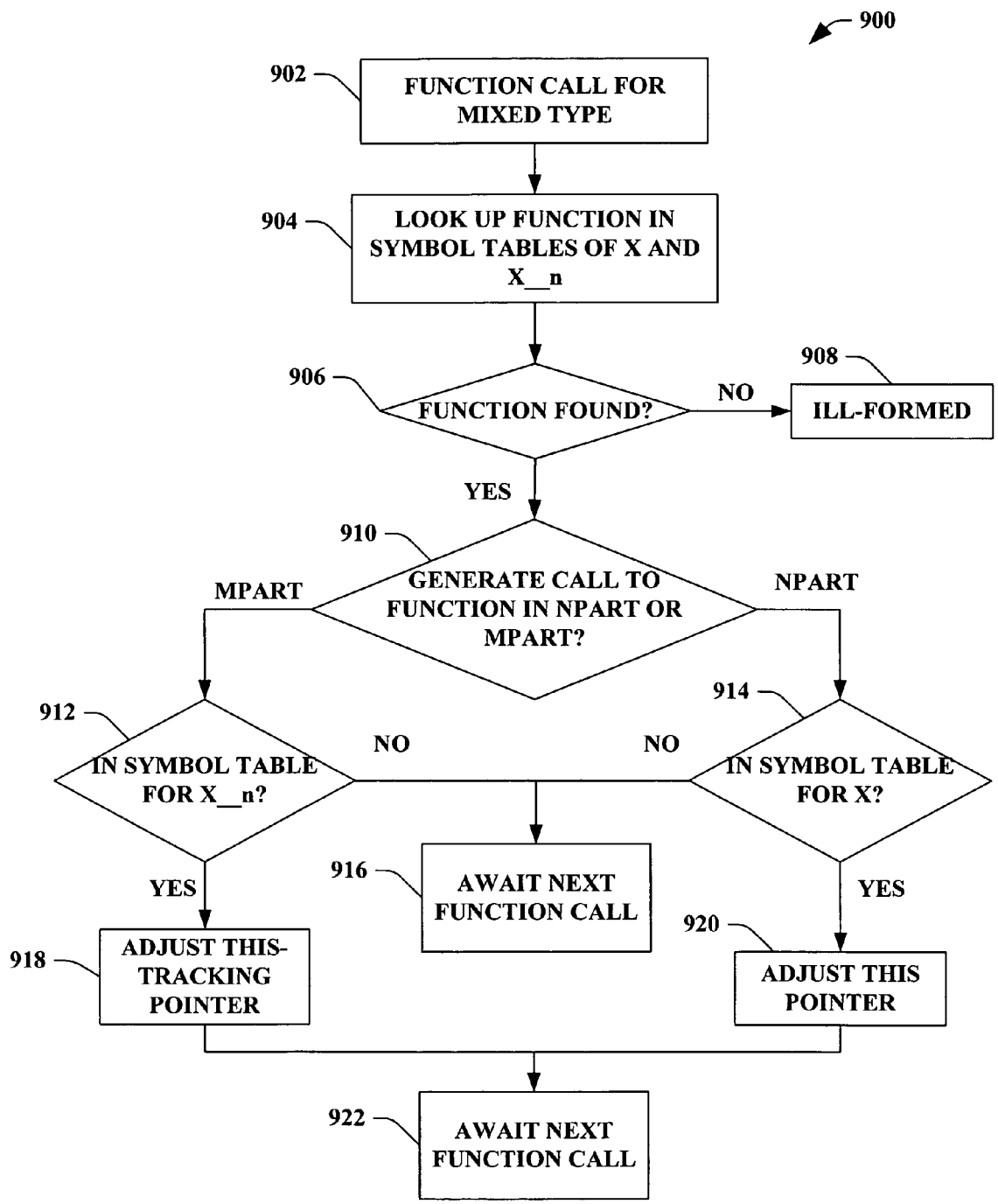
FIG. 9 illustrates a flow chart of an exemplary methodology that facilitates programming by employing a mixed type that allows managed types and native types to be treated consistently in a plurality of contexts.

FIGS. 7-9 illustrate methodologies in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement the methodologies in accordance with the present invention. In addition, those skilled in the art will understand and appreciate that the methodologies could alternatively be represented as a series of interrelated states via a state diagram or events.

FIG. 7 illustrates a methodology 700 that facilitates programming for a C++ user within a .NET environment wherein mixed types are employed such that managed types and native types are treated consistently in all contexts. At 702, code is received and restrictions are placed upon a compiler. For example, the compiler is not required to add an additional Normal GCHandle to a gcnew'd mixed object as an internal object model implementation detail beyond the user-defined members of the class and/or not required to implement a ^ as a Normal GCHandle or otherwise physically placing the implementation of a handle (^) in a place that the garbage collector cannot collect. Next at 704, the code is distinguished into pure native, pure managed and mixed native and managed.

Then at 706, the distinguished code is allocated. The compiler lays out the pure native such that no members are added or changed in the native heap. The pure managed code is laid out by the runtime such that no members are added or changed in the managed heap (e.g., garbage collected heap). The mixed native and managed are laid out in memory into two parts. At 708, the mixed type is created containing a pure native part (npart) and a pure managed part (mpart). The mpart is a pure managed class obeying ISO CLI rules governing managed classes. The mpart contains all members of managed and ^ type and a native pointer corresponding to npart. Conversely, the npart is a pure native class obeying ISO C++ rules governing native clases. The npart contains all members of native type and a GCHandle corresponding to its mpart. Lastly at 710, the mixed type is utilized to facilitate programming for a C++ user within a NET environment.

FIG. 8 illustrates a methodology 800 that facilitates constructing and destructing mixed types such that managed types and native types are treated consistently in all contexts. At 802, the construction follows a specific order. First, virtual bases are constructed. Next, native bases are constructed in usual ISO C++ order. Lastly, managed base classes are constructed. Once the bases are constructed, the members are constructed in usual ISO C++ order at 804, for example, the order appearing in class definition. The method then proceeds to await the invocation of destruction at 806. At 808, destruction starts in the reverse order of construction. First the members are destructed in order specified, for example, by class definition. Next at 810, managed base classes are destructed, followed by the destruction of native base classes and lastly virtual base classes.

FIG. 9 illustrates a methodology 900 that facilitates calling a function for a mixed type such that managed types and native types are treated consistently in all contexts. At 902, a function call is made for a mixed class type. At 904, the function is looked up in the symbol tables of X (e.g., the mpart—pure managed part) and X_n (e.g., the npart—pure native part). At 906, a determination is made whether the function is found. If not found, the function call is ill-formed at 908. If found, the method proceeds to 910.

At 910, if the call to the function is generated in the npart, the method proceeds to 914. If the function call is generated in the mpart, the method proceeds to 912. At 914, if the function is in the symbol table for X, then the this-tracking-pointer is adjusted at 920. For example, the this-tracking-pointer is converted to a this-pointer wherein the this pointer is the address that is stored in _nimpl. Once the this-tracking-pointer is adjusted, the method awaits a function call for a mixed class type at 922. Yet, if the function is not found in the symbol table for X, the method awaits the next function call for a mixed type at 916. When the function call is generated in the mpart at 912, the symbol table for X_n is searched seeking the function. If the function is not found, the method awaits the next function call for the mixed type at 916. However, if the function is found in the symbol table for X_n, the this-pointer is adjusted at 918. For example, the this pointer is converted to a this tracking-pointer wherein the this-tracking-pointer is the address that is stored in _mimpl. Once the this-pointer is adjusted, the method awaits the next function call for the mixed class type at 922.

Figure 10:
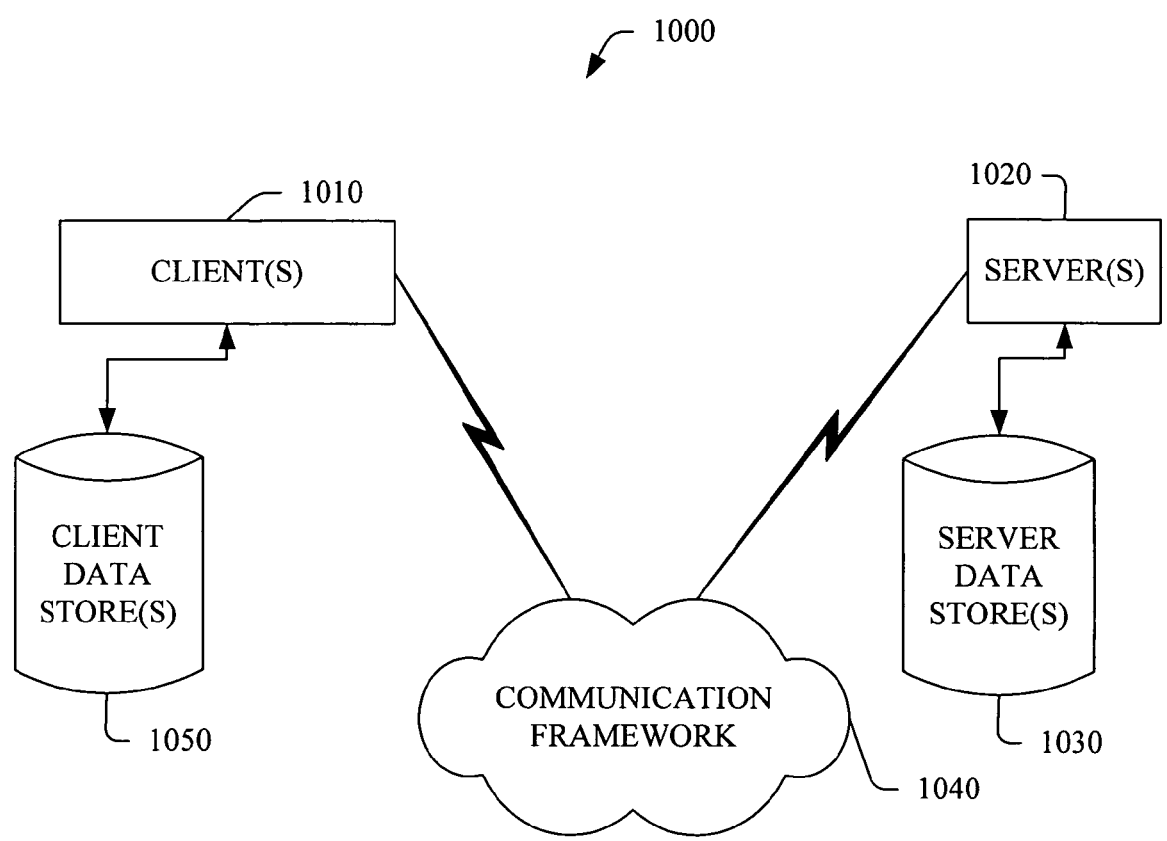
FIG. 10 illustrates an exemplary networking environment, wherein the novel aspects of the present invention can be employed.
Figure 11:
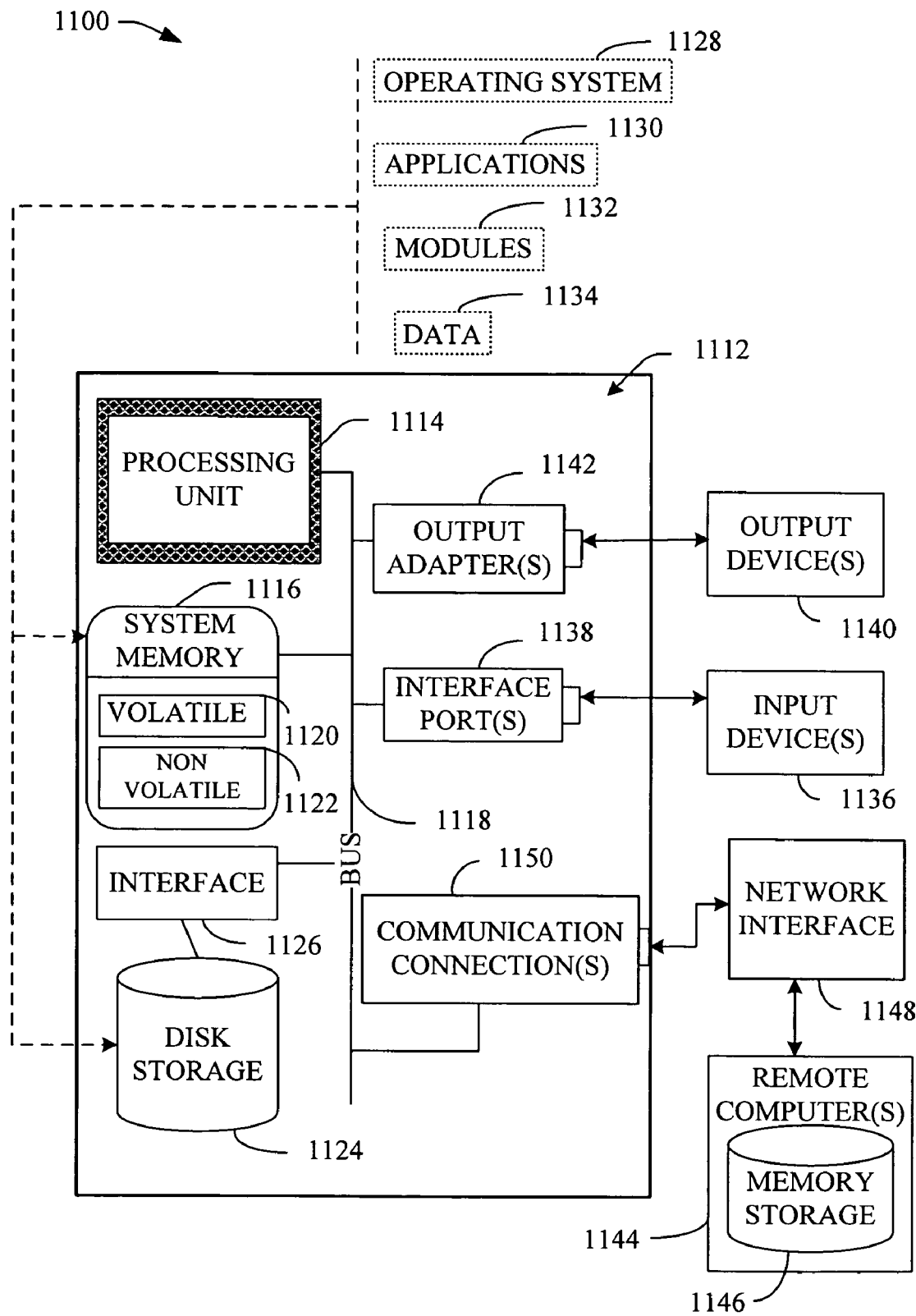
FIG. 11 illustrates an exemplary operating environment, wherein the novel aspects of the present invention can be employed.

In order to provide additional context for implementing various aspects of the present invention, FIGS. 10-11 and the following discussion is intended to provide a brief, general description of a suitable computing environment in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the present invention, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1040.

With reference to FIG. 11, an exemplary environment 1100 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multi-processor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates programming utilizing mixed types in a managed code environment, comprising:
at least one processor that executes the following computer executable components stored on at least one computer readable medium:
a component that receives code to be utilized by a compiler, the code comprising:
a pure native portion;
a pure managed portion; and
a mixed portion, the mixed portion comprising at least one of:
a managed class type that is not a pure managed class, the managed class type having at least one user-defined member of native type; or
a native class type that is not a pure native class, the native class type having at least one user-defined member of managed type;
wherein the pure native portion is a native class type that does not include user defined members or base classes of managed type or handle (^) type and the pure managed portion is a managed class type that does not include user-defined members or base classes of native type, native pointer (*), or native reference (&); and
an inheritance component that designates respective sections of the at least one of the managed class type or the native class type of the code as one or more pure native parts (npart) and one or more pure managed parts (mpart) to facilitate compiling of the code, the inheritance component enables per-object garbage collection in memory, wherein a subset of objects of the at least one of the managed class type or the native class type of the code is garbage collected.

2. The system of claim 1, wherein the mpart is a pure managed class that obeys ISO (International Standards Organization)CLI(Common Language Infrastructure) rules and the npart is a pure native class that obeys ISO C++ rules.

3. The system of claim 1, wherein the mpart inherits from a base class of managed type.

4. The system of claim 1, wherein the mpart inherits from the mpart of a base class of mixed type.

5. The system of claim 1, wherein the mpart inherits from an interface base class.

6. The system of claim 1, wherein the mpart comprises a member of managed type and handle (^) type.

7. The system of claim 6, wherein the mpart comprises a member of simple value type.

8. The system of claim 1, wherein the mpart comprises a native pointer to a corresponding npart.

9. The system of claim 1, wherein the mpart comprises metadata.

10. The system of claim 1, wherein the mpart allocation is done at runtime.

11. The system of claim 1, wherein the npart inherits from a base class of native type.

12. The system of claim 1, wherein the npart inherits from an npart of a base class of a mixed type.

13. The system of claim 1, wherein the npart comprises a member of native type.

14. The system of claim 13, wherein the npart comprises a member of simple value type.

15. The system of claim 1, wherein the npart comprises a GCHandle (Garbage Collector Handle) to a corresponding mpart.

16. The system of claim 15, wherein the GCHandle is Normal.

17. The system of claim 16, wherein the GCHandle is WeakTrackResurrection.

18. The system of claim 1, wherein the npart includes program database (PDB) information.

19. The system of claim 1, wherein the npart allocation is performed by a compiler.

20. The system of claim 1, wherein the code contains a reference class type and native class types wherein the mpart resides on a managed heap.

21. The system of claim 1, wherein the code contains a value type wherein the mpart resides on a managed heap.

22. The system of claim 1, wherein the code contains a value type wherein the mpart resides on a stack.

23. The system of claim 1, further comprises a restriction component that requires a compiler to not add an additional Normal GCHandle (Garbage Collector Handle) to a gcnew'd (Garbage Collected New) mixed object as an internal object implementation detail beyond a user-defined member of the class.

24. The system of claim 23, wherein the restriction component requires the compiler to implement a handle (^) as a Normal GCHandle.

25. The system of claim 1, further comprises a construction component that constructs at least one of a virtual base class, a native base class, a managed base class, or a member for the mixed type.

26. The system of claim 1, further comprises a destruction component that destructs a member, a managed base class, a native base class and a virtual base class for the mixed type.

27. The system of claim 1, further comprises a function component that calls functions for the mixed type.

28. A computer-implemented method that facilitates programming utilizing mixed types in a managed code environment, comprising:
  employing at least one processor to execute computer executable instructions stored on at least one computer readable storage medium to perform the following acts:
  classifying respective portions of code as a pure native type, a pure managed type and a mixed type, the mixed type comprising at least one of:
    a managed class type that is not a pure managed class, the managed class type having at least one user-defined member of native type; or
    a native class type that is not a pure native class, the native class type having at least one user-defined member of managed type;
  wherein the pure native class is a native class type that does not include user-defined members or base classes of managed type or handle (^) type and the pure managed class is a managed class type that does not include user-defined members or base classes of native type, native pointer (*), or native reference (&);
  associating respective sections of the at least one of the managed class or the native class type of the code with the pure native type portions and pure managed type portions to facilitate compiling the code; and
  providing per-object garbage collection in memory, wherein a subset of objects of the at least one of the managed class type or the native class type of the code is garbage collected.

29. The method of claim 28, further comprising restricting a compiler with use of Normal GCHandle (Garbage Collector Handle) and handle (^).

30. A computer-implemented method that facilitates programming utilizing mixed types, comprising:
  employing at least one processor to execute computer executable instructions stored on at least one computer readable storage medium to perform the following acts:
  constructing a virtual base class, a native base class, a managed base class;
  constructing members in order as specified in a class definition; and
  creating a constructor associated with a mixed type for each external accessible constructor provided and an additional constructor without an additional hidden parameter that forwards to the constructor with an added parameter, the mixed type comprising at least one of:
    a managed class type that is not a pure managed class, the managed class type having at least one user-defined member of native type; or
    a native class type that is not a pure native class, the native class type having at least one user-defined member of managed type;
  wherein the pure native class is a native class type that does not include user-defined members or base classes of managed type or handle (^) type and the pure managed class is a managed class type that does not include user-defined members or base classes of native type, native pointer (*), or native reference (&); and
  wherein an inheritance component designated respective sections of the at least one of the managed class type or the native class type of the mixed type as one or more pure native parts (npart) and one or more pure managed parts (mpart) to facilitate compiling of the mixed type.

31. A computer-implemented method that facilitates programming utilizing mixed types, comprising:
  employing at least one processor to execute computer executable instructions stored on at least one computer readable storage medium to perform the following acts:
  destructing members in order as specified in a class definition;
  destructing a managed base class, a native base calls, and a virtual base class; and
  destructing a mixed type by destroying a native part and a managed part of the mixed type, the mixed type comprising:

a managed class type that is not a pure managed class, the managed class type having at least one user-defined member of native type; or a native class type that is not a pure native class, the native class type having at least one user-defined member of managed type;

wherein the pure native class is a native class type that does not have user-defined members or base classes of managed type of handle (^) type and the pure managed class is a managed class type that does not have user-defined members or base classes of native type, native pointer (*), or native reference (&); and wherein an inheritance component designated respective sections of the at least one of the managed class type or the native class type of the mixed type as one or more pure native parts (npart) and one or more pure managed parts (mpart) to facilitate compiling of the mixed type.

32. A computer-implemented method that facilitates programming utilizing mixed types, comprising:

employing at least one processor to execute computer executable instructions stored on at least one computer readable storage medium to perform the following acts:

calling a function for a mixed type, the mixed type is:

a managed class type that is not a pure managed class, the managed class type having at least one user-defined member of native type; or a native class type that is not a pure native class, the native class type having at least one user-defined member of managed type;

wherein the pure native class is a native class type having no user defined members or base classes of managed type or handle (^) type and the pure managed class is a managed class type having no user-defined members or base classes of native type, native pointer (*), or native reference (&);

looking up the function in symbol tables;

locating the function;

generating a function call in a part of the mixed type;

adjusting a pointer for the part of the mixed type; and providing per-object garbage collection in memory, wherein a subset of objects of the managed class type or the native class type is garbage collected.

33. The method of claim 32, wherein the part of the mixed type is at least one of a pure native type (npart) and a pure managed type (mpart).

34. A computer implemented system that facilitates programming utilizing mixed types, comprising:

at least one processor;

at least one computer readable storage medium storing computer executable instructions that when executed by the at least one processor implement components comprising:

means for separating code into a pure native type, a pure managed type, a mixed type, a definition of a type does not affect where that type can be allocated, the mixed type comprising at least one of:

a managed class type that is not a pure managed class, the managed class type having at least one user-defined member of native type; or a native class type that is not a pure native class, the native class type having at least one user-defined member of managed type;

wherein the pure native class is a native class type that does not include user defined members or base classes of managed type or handle (^) type and the pure managed class is a managed class type that does not include user-defined members or base classes of native type, native pointer (*), or native reference (&);

means for creating a mixed type from the mixed type containing an associated pure native part and pure managed part;

means for utilizing the mixed type with a compiler;

means for conceptually instantiating all types in a code in all memory areas;

means for enabling native pointer (*), native reference (&) and handle (^) to refer to each type wherein * has consistent meaning regardless on the type it points; and means providing per-object garbage collection in memory, wherein a subset of objects of the at least one of the managed class type or the native class type of the code is garbage collected.

* * * * *